(12) United States Patent
Wilkinson et al.

(10) Patent No.: US 8,534,729 B2
(45) Date of Patent: Sep. 17, 2013

(54) HIGH-FORCE ROBOTIC GRIPPER

(75) Inventors: Loran J. Wilkinson, Palm Bay, FL (US); Matthew D. Summer, Melbourne, FL (US); John B. Rust, Palm Bay, FL (US); Paul M. Bosscher, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 112 days.

(21) Appl. No.: 13/197,933

(22) Filed: Aug. 4, 2011

(65) Prior Publication Data

US 2013/0033053 A1 Feb. 7, 2013

(51) Int. Cl.
*B25J 15/02* (2006.01)
*B25J 15/08* (2006.01)

(52) U.S. Cl.
USPC ................................ 294/106; 901/34; 901/38

(58) Field of Classification Search
USPC ..................... 294/106, 116, 213; 901/32, 33, 901/34, 38; 173/92, 93, 93.6
See application file for complete search history.

(56) References Cited

U.S. PATENT DOCUMENTS

| | | | |
|---|---|---|---|
| 898,702 A | 9/1908 | Taylor | |
| 975,891 A | 11/1910 | Prellwitz | |
| 2,825,436 A * | 3/1958 | Amtsberg | 173/93.6 |
| 3,370,213 A * | 2/1968 | Glenn | 318/513 |
| 4,114,464 A | 9/1978 | Schubert et al. | |
| 4,132,318 A | 1/1979 | Wang et al. | |
| 4,149,278 A * | 4/1979 | Frosch et al. | 623/62 |
| 4,544,193 A | 10/1985 | Dunn et al. | |
| 4,572,564 A | 2/1986 | Cipolla | |
| 4,579,380 A | 4/1986 | Zaremsky et al. | |
| 4,600,357 A * | 7/1986 | Coules | 414/730 |
| 4,609,220 A | 9/1986 | Scott | |
| 4,653,793 A | 3/1987 | Guinot et al. | |
| 4,680,523 A | 7/1987 | Goumas et al. | |
| 4,770,455 A | 9/1988 | Collins, Jr. | |
| 4,841,832 A * | 6/1989 | Snavely et al. | 81/57.37 |

(Continued)

FOREIGN PATENT DOCUMENTS

| | | |
|---|---|---|
| DE | 10 2008 042261 A1 | 4/2010 |
| EP | 1 507 259 A1 | 2/2005 |
| JP | 11 320473 A | 11/1999 |
| WO | 2010 040215 A1 | 4/2010 |

OTHER PUBLICATIONS

Information about Related Patents and Patent Applications, see section 6 of the accompanying Information Disclosure Statement Leter, which concerns Related Patents and Patent Applications.

(Continued)

*Primary Examiner* — Dean Kramer
(74) *Attorney, Agent, or Firm* — Fox Rothschild, LLP; Robert J. Sacco

(57) ABSTRACT

A robotic gripper (10) has fingers (12) that are configured to grasp an object, and an actuator (20) for driving the fingers. The actuator has a drive train (30) connected to the fingers for driving the fingers, an impact mechanism (40) mechanically connected to the drive train for driving the drive train, and a motor (50) connected to the impact mechanism for driving the impact mechanism. The impact mechanism generates a series of impacts that are delivered to the drive train when the impact mechanism is loaded beyond a threshold torque. The drive train is a back-drive inhibited drive train provided by a worm drive (32, 34) that is mechanically coupled to the impact mechanism.

13 Claims, 3 Drawing Sheets

(56) References Cited

U.S. PATENT DOCUMENTS

| | | | |
|---|---|---|---|
| 5,011,207 A | 4/1991 | Stevens | |
| 5,092,645 A | 3/1992 | Okada | |
| 5,280,981 A * | 1/1994 | Schulz | 294/106 |
| 5,403,057 A | 4/1995 | Sugito et al. | |
| 5,407,185 A | 4/1995 | Zehnpfennig et al. | |
| 5,992,538 A * | 11/1999 | Marcengill et al. | 173/93 |
| 6,217,094 B1 | 4/2001 | Hanaduka et al. | |
| 6,377,011 B1 | 4/2002 | Ben-Ur | |
| D466,780 S | 12/2002 | Stirm | |
| 7,014,235 B1 * | 3/2006 | Ostwald | 294/119.1 |
| 7,125,010 B2 | 10/2006 | Moore et al. | |
| 7,168,748 B2 | 1/2007 | Townsend et al. | |
| 7,370,896 B2 * | 5/2008 | Anderson et al. | 294/106 |
| 7,513,546 B2 | 4/2009 | Vranish | |
| 2009/0014193 A1 * | 1/2009 | Barezzani et al. | 173/93 |
| 2010/0156127 A1 | 6/2010 | De Kervanoael | |

OTHER PUBLICATIONS

International Search Report mailed Jun. 21, 2012 in Application Serial No. PCT/US2012/027469 in the name of Harris Corporation.
Information about Related Patents and Patent Applications, see section 6 of the accompanying Information Disclosure Statement Letter, which concerns Related Patents and Patent Applications, Apr. 8, 2013.
International Search Report mailed Dec. 20, 2012 in International Application Serila No. PCT/US2012/049214, in the name of Harris Corporation.

\* cited by examiner

HIGH-FORCE ROBOTIC GRIPPER

STATEMENT OF THE TECHNICAL FIELD

The inventive arrangements relate generally to robotic grasping devices. More particularly, the invention concerns high force robotic grippers.

DESCRIPTION OF THE RELATED ART

Remotely controlled robotic systems are growing increasingly common for use in areas in which a human can be subjected to dangerous or otherwise unpleasant work environments. One important component of a robotic system is a grasping device or gripper used to grasp objects that are to be lifted, moved or otherwise manipulated. Typical grippers include one or more robot fingers that can be moved by an actuator to effect such grasping operations.

For many tasks it is desirable that the gripper have both a high closing speed and a high gripping force. For example, grippers for small mobile robots might need to be able to grip a 6-inch diameter object with 40 lbs of gripping force and fully close in one second. To achieve both of these goals a high-power actuator is generally required. For example, hydraulic actuators provide a high gripping force but require high-pressure fluids and the attendant pumps and lines to supply and deliver these fluids and thus are heavy. The same is true of pneumatic grippers, which also suffer from the defect of having a relatively low stiffness in their gripping strength. In many applications it is not reasonable to use large, high-power actuators for the gripper due to issues relating to size, weight, power limitations or combinations thereof. Hence, many systems turn to electric actuators. Electric actuators offer medium to low force gripping strengths relative to hydraulic and pneumatic systems but are considerably easier to implement in terms of power supplies and control systems and are considerably lighter as well. However, electric systems also suffer from low power densities.

It would therefore be desirable to have a gripper system that offered both strong and fast gripping strengths and speeds, without the attendant power supply and weight issues of hydraulic and pneumatic systems.

SUMMARY OF THE INVENTION

A robotic gripper includes a plurality of fingers configured for grasping an object and an actuator for driving the fingers. The actuator includes a drive train mechanically coupled to the movable fingers for driving the fingers, an impact mechanism mechanically coupled to the drive train for driving the drive train, and a driving device mechanically coupled to the impact mechanism for driving the impact mechanism. The impact mechanism is configured to generate a series of impacts that are delivered to the drive train when loaded beyond a threshold torque. In preferred embodiments the drive train is a back-drive inhibited drive train and the driving device is an electric motor. In a specific embodiment the back-drive inhibited drive train comprises a worm drive mechanically coupled to the impact mechanism.

In various embodiments the impact mechanism comprises an anvil coaxially engaged with a hammer, and the driving device is mechanically coupled to the hammer while the drive train is mechanically coupled to the anvil. The hammer comprises contact surfaces configured to strike corresponding contact surfaces on the anvil. In a specific embodiment the hammer is axially biased towards the anvil; the hammer contact surfaces and the anvil contact surfaces are sloped at an angle that is less than 90° with respect to a plane of rotation of the hammer and anvil, respectively.

BRIEF DESCRIPTION OF THE DRAWINGS

Embodiments will be described with reference to the following drawing figures, in which like numerals represent like items throughout the figures, and in which.

DETAILED DESCRIPTION

The various embodiments of the present invention are described with reference to the attached figures, wherein like reference numbers are used throughout the figures to designate similar or equivalent elements. The figures are not drawn to scale and they are provided merely to illustrate the embodiments of the present invention. Several aspects of the invention are described below with reference to example applications for illustration. It should be understood that numerous specific details, relationships, and methods are set forth to provide a full understanding of the invention. One having ordinary skill(s) in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts can occur in different orders and/or concurrently with other acts or events. Furthermore, not all illustrated acts or events are required to implement a methodology in accordance with the present invention.

Figure 1:
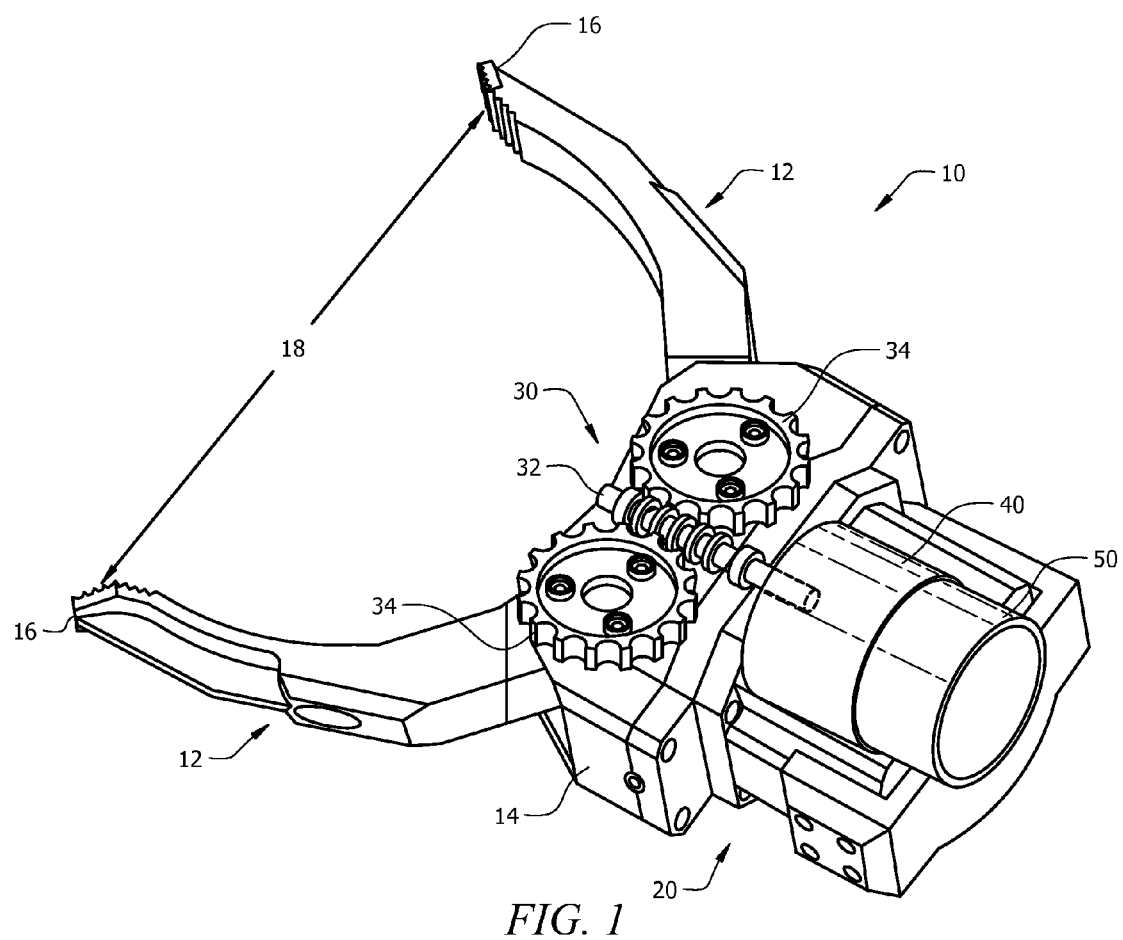
FIG. 1. is a perspective view of an embodiment robotic gripper.

The present invention concerns actuators for robotic grasping devices. More particularly, the invention concerns actuators that can be implemented using electric systems but which also offer both fast opening and closing speeds in conjunction with high gripping strengths. An embodiment robotic gripper 10 is shown in FIG. 1. The robotic gripper 10 includes a plurality of fingers 12, which are configured for grasping an object. For purposes of the following the fingers 12 are shown as elongated structures. However, it should be understood that the fingers 12 can have any suitable shape that is adapted for the particular task or object that the fingers 12 are intended to work upon.

At least one of the fingers 12 is movably mounted within housing 14, such as by way of pivots, hinges, or the like, so that the fingers 12 have an open position and a closed position. While in the open position, as shown in FIG. 1, distal ends 16 of the fingers 12 are separated from each other by a gap 18 having a width that is sufficient to accept the object to be grasped. When in the closed position, the distal ends 16 move towards each other, reducing the width of the gap 18 so that each finger 12 may contact and squeeze the object to be grasped.

In preferred embodiments, as shown in FIG. 1, both fingers 12 are movable. An actuator 20, preferably mounted in the housing 14, is used to drive the movable finger or fingers 12 to increase and decrease the width of the gap 18. An embodiment actuator 20 includes a drive train 30, an impact mechanism 40 and a driving device 50. The driving device 50 generates a first toque that drives the impact mechanism 40. The impact mechanism 40, in turn, generates a second toque that drives the drive train 30. The drive train 30, in turn, drives the movable fingers 12 to move into open and closed positions.

The drive train 30 is preferably a back-drive inhibited drive train (BIDT). A BIDT is a drive train which will facilitate movement of a driven element (in this case movable fingers 12) only when such movement is initiated by the driving device 50, and will inhibit such movement when a force is exerted upon the drive train by the driven component. Accordingly, the movable fingers 12 will generally tend to remain in a fixed position when the driving device 50 is deactivated, i.e., no longer provides an output torque. Hence, when operating in a first direction that causes the fingers 12 to close, the BIDT 30 will not permit the fingers 12 to open once the driving device 50 shuts down. Any suitable mechanism can be employed for a BIDT 30, including ratchet mechanisms or the like. In a preferred embodiment the BIDT 30 is provided by a worm drive, which comprises a worm gear 32 driving one or more spur gears 34. Each spur gear 34 is coupled to a respective movable finger 12 such that rotation of the spur gear 34 causes a corresponding pivotal rotation of the corresponding finger 12 with respect to the housing 14. The worm gear 32 is driven by the output torque of the impact mechanism 40. Because of the extremely high gearing ratio of the worm gear 32 with respect to the spur gears 34, the worm gear 32 can easily drive the spur gears 34, whereas the spur gears 34 cannot make the worm gear 32 rotate. Hence, reactive forces present on the fingers 12 cannot cause the fingers 12 to open or close any further than dictated by the movement of the drive train 30 as dictated by driving device 50.

Figure 2:
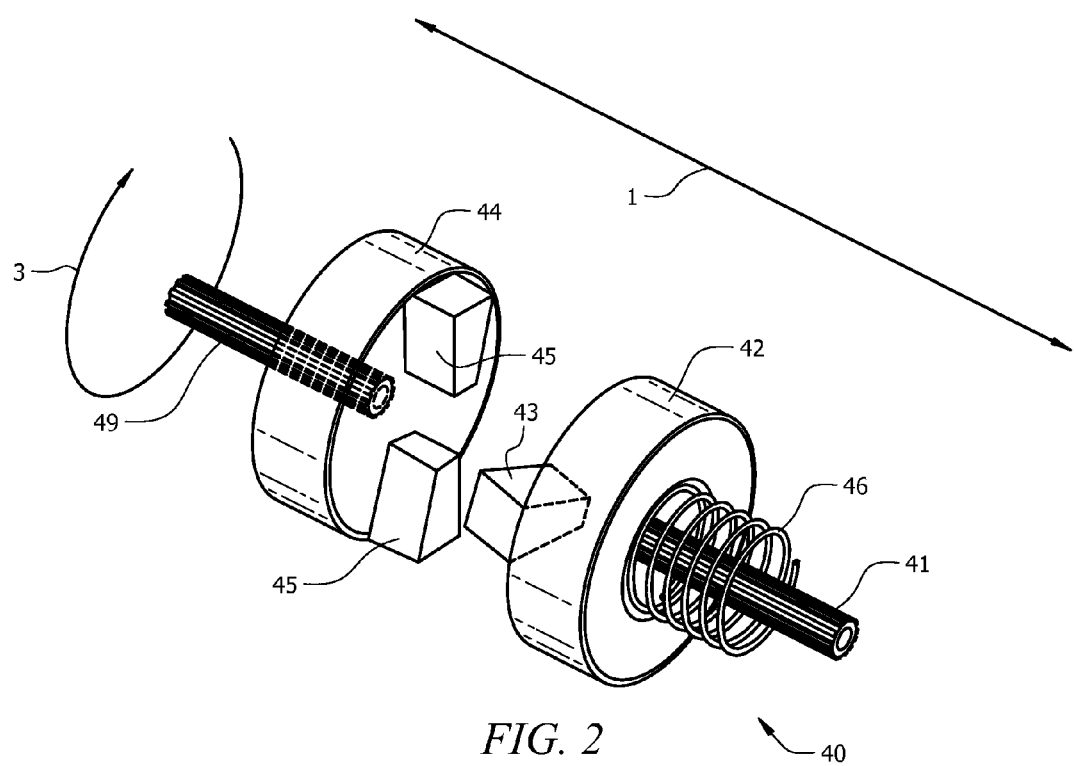
FIG. 2 is an exploded perspective view of an embodiment impact mechanism.

An embodiment impact mechanism 40 is illustrated in FIGS. 2 and 3. The impact mechanism 40 takes the first torque provided by the driving device 50 via an input shaft 41 and uses this mechanical energy to generate a second, output torque on an output shaft 49. The output shaft 49, in turn, drives the drive train 30. In preferred embodiments, the impact mechanism 40 generates a steady, smoothly continuous output torque that is substantially the same as the input torque provided by the driving device 50, but when loaded beyond a threshold torque then delivers a series of impacts, which are short in duration but of high torque. Impact driving devices are known in other fields, such as impact wrenches and the like, and the impact mechanisms used in such devices may be adapted for use as an embodiment impact mechanism 40.

A preferred embodiment impact mechanism 40 includes a hammer 42 connected to the input shaft 41, and the hammer 42 engages with a corresponding anvil 44 that is connected to the output shaft 49. The hammer 42 is rotatably mounted within the housing 14 so as to also be movable along an axial direction 1. The anvil 44 is preferably only rotatably mounted within the housing 14 and is fixed with respect to the axial direction 1. A spring 46, preferably disposed around the input shaft 41, is used to bias the hammer 42 axially towards the anvil 44. Any suitable arrangement can be used to provide for the rotational mounting and axial biasing of the hammer 42 with respect to the anvil 44. Simply by way of example, the hammer 42 can slide axially along input shaft 41, or the input shaft 41 can be slidably set within a sleeve or the like that supports both rotational and axial movement of the input shaft 41. Alternatively, the hammer 42 can be axially fixed whereas the anvil 44 is axially movably biased towards the hammer 42.

Figure 3A:
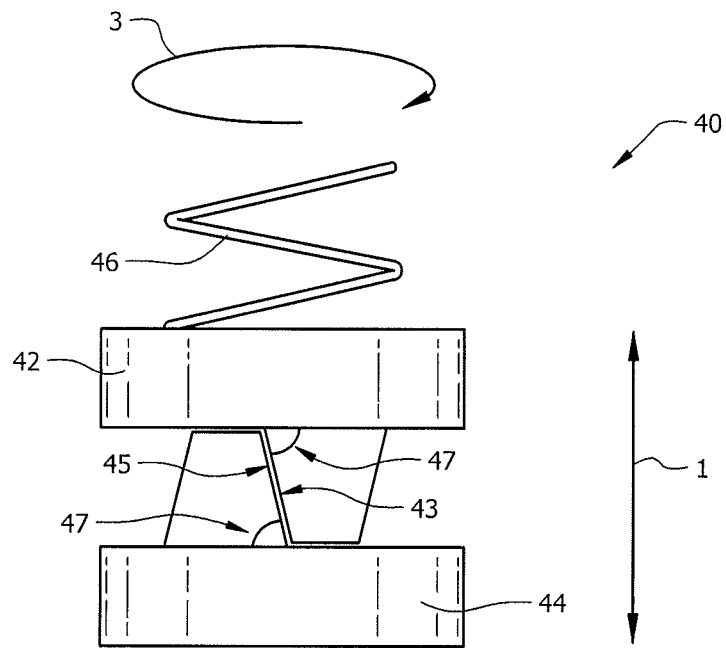
FIGS. 3A and 3B are side views of an embodiment impact mechanism.
Figure 3B:
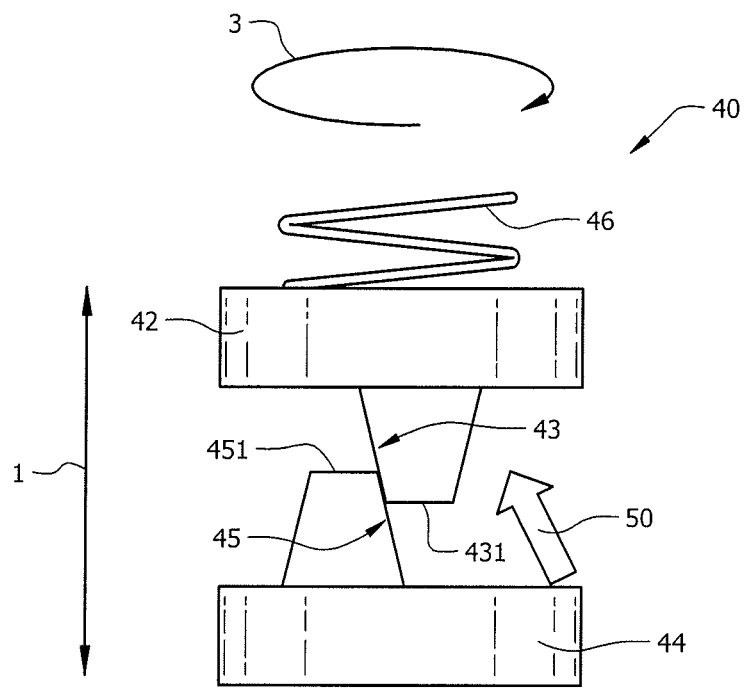

The hammer 42 includes at least one contact surface 43 that contacts a corresponding contact surface 45 on the anvil 44. Torque delivered by the driving device 50 along the input shaft 41 is thus transferred to the anvil 44 by way of the respective contact surfaces 43, 45 of the hammer 42 and anvil 44. Preferably there are at least two hammer contact surfaces 43 that engage with corresponding anvil contact surfaces 45, and which are evenly angularly disposed around the input shaft 41 and output shaft 49, respectively, so as to provide a balanced torque about each shaft 41, 49. As shown in FIGS. 3A and 3B, the contact surfaces 43, 45 are set at an angle 47 that is less than 90° with respect to the rotational plane of the hammer 42 and anvil 44. This angle 47 can be adjusted to set the strength of the threshold torque above which the impact mechanism 40 stops generating a continuous torque and instead begins generating a series of sharp impacts. Similarly, adjusting the spring constant of the spring 46 can also be used to adjust the threshold torque. Smaller angles 47 and more resilient springs 46 will create lower threshold torque values, while greater angles 47 and stiffer springs 46 will increase the threshold torque value. In preferred embodiments the threshold torque value is set to be less than the maximum output torque of the driving device 50.

As shown in the embodiment 40 of FIGS. 3A and 3B, the spring 46 biases the hammer 42 along the axial direction 1 towards the anvil 44. While the load on the impact mechanism 40 is less than the threshold torque, the contact surfaces 43, 45 will remain engaged with each other without any slipping, causing the hammer 42 and anvil 44 to rotate together at the same speed and rotational direction 3 as provided on input shaft 41, thus generating an output torque on the output shaft 49 that is substantially equal in strength and duration to that present on the input shaft 41. However, when the output shaft 49 comes under a load that exceeds the threshold torque, the hammer contact surfaces 43 will begin sliding against their corresponding anvil contact surfaces 45, working against the bias of the spring 46, as shown in FIG. 3B. This sliding will result in axial movement of the hammer 42 in a direction away from anvil 44, as indicated by arrow 50. Finally, when the tips 431 of the hammer contact surfaces 43 are aligned with the tips 451 of the anvil 45 contact surface, the tips 431, 451 will slide over and across one another. At that point, unloaded, the hammer 42 will undergo a relatively rapid angular acceleration in the rotational direction 3, with the hammer 42 thus rapidly gaining angular speed. As such gain in angular speed, and hence angular momentum, progresses, the tips 431 of the hammer contact surface 43 will slide past the tips 451 of the anvil contact surface 45. When that occurs, the biasing force of spring 46 will cause movement of the hammer 42 in the axial direction 1 back towards anvil 44. The hammer contact surfaces 43 will then continue to accelerate in the rotational direction 3 towards the next set of corresponding anvil contact surface 45, causing an impact between the surfaces 43, 45. This impact is of short duration, but due to the angular momentum of the hammer 42, is of high torque, which is transferred to the output shaft 49 via the anvil 44. Notably, the resultant impact torque on the output shaft 49 can exceed the maximum torque that the driving device 50 is capable of generating. In some embodiments this impact torque can exceed the maximum output torque of the motor 50 by as much as five times. The contact surfaces 43, 45 will then slide over each other again and the process will repeat, thereby generating a repetitive series of high-torque impacts on the output shaft 49.

The driving device 50 is preferably an electric motor, although any suitable torque-generating device can be employed. Electric motors are preferred as they and their related power supply and control systems are relatively light, compact and easy to use. As discussed above, the impact mechanism 40 is preferably configured such that its threshold torque is below the maximum output torque of the motor 50. For example, the threshold torque for the impact mechanism 40 can be set to be between 80% and 90% of the maximum output torque of the motor 50.

The benefit of the embodiment actuator 20 is that although a relatively low torque motor 50 is used, the final output torque 49 is considerably higher, and hence the grasping strength of the fingers 12 is considerably stronger, than what would otherwise be expected from the motor 50. However, the fingers 12 continue to have rapid opening and closing movements, which would not be the case if the actuator 20 simply used high gearing ratios for the output torque of the motor 50. When the load upon the actuator 20 is low, such that the load present on the output shaft 49 is less than the threshold toque of the impact mechanism 40, the impact mechanism 40 will rotate continuously at the same speed as the motor 50. Accordingly, the arrangement described herein permits the fingers 12 to open and close as rapidly as would be experienced with standard electric systems with normal gearing ratios. However, when the load on the output shaft 49 exceeds the threshold torque, as when the fingers 12 begin to bear down upon an object being grasped, the impact mechanism 40 will no longer generate a smoothly continuous torque on the output shaft 49 but instead will generate a series of impacts having impulse values that exceed the maximum output torque of the motor 50. Further, because the BIDT 30 inhibits back-drive, reactive forces present on the fingers 12 and transmitted back to the drive train 30 will not cause the drive train 30 to move in the direction urged by such reactive forces, and hence the fingers 12 will not release or weaken their grip on an object being grasped, even in between impulses or when the motor 50 shuts down.

When an object is tightly grasped by the fingers 12, the reactive forces present on the fingers 12 may tend to lock up the BIDT 30 to a degree that exceeds the maximum output torque of the motor 50. Nevertheless, when operated in a reverse direction 3, the motor 50 can still cause the fingers 12 to release the object. When doing so, initially the reactive forces on the object will place a load on the impact mechanism 40 that exceeds the threshold torque. As a result, the impact mechanism will generate a series of hammering impulses that are delivered to the fingers 12, which will eventually cause the fingers 12 to open sufficiently such that the reactive forces create a load that falls below the threshold torque. At that point the hammer 42 and anvil 44 will then continuously engage with each other, generating a continuous output torque that effectively tracks the input torque and speed provided by the motor 50. Hence, the fingers will then open as quickly as would be expected of standard electric systems with normal gearing ratios. In short, then, when the motor 50 runs in a reverse direction, the same principle of operation will cause the fingers 12 to release their hold on an object and open rapidly by way of the smoothly continuous spinning of the impact mechanism 40.

All of the apparatus, methods and algorithms disclosed and claimed herein can be made and executed without undue experimentation in light of the present disclosure. While the invention has been described in terms of preferred embodiments, it will be apparent to those of skill in the art that variations can be applied to the apparatus, methods and sequence of steps of the method without departing from the concept, spirit and scope of the invention. More specifically, it will be apparent that certain components can be added to, combined with, or substituted for the components described herein while the same or similar results would be achieved. All such similar substitutes and modifications apparent to those skilled in the art are deemed to be within the spirit, scope and concept of the invention as defined.

We claim:

1. A robotic gripper, comprising:
   a plurality of fingers configured for grasping an object; and
   an actuator for driving at least one of the fingers, the actuator comprising:
   a drive train mechanically coupled to the at least one finger for driving the at least one finger;
   an impact mechanism mechanically coupled to the drive train for driving the drive train, the impact mechanism configured to generate a series of impacts that are delivered to the drive train when loaded beyond a threshold torque; and
   a driving device mechanically coupled to the impact mechanism for driving the impact mechanism;
   wherein the impact mechanism comprises an anvil coaxially engaged with a hammer, the driving device mechanically coupled to the hammer, and the drive train mechanically coupled to the anvil, wherein the hammer comprises a contact surface configured to strike at least a contact surface on the anvil; and
   wherein the hammer contact surface and the anvil contact surface are sloped at an angle that is less than 90° with respect to a plane of rotation of the hammer and anvil, respectively.

2. The robotic gripper of claim 1, wherein the drive train is a back-drive inhibited drive train.

3. The robotic gripper of claim 2, wherein the back-drive inhibited drive train comprises a worm drive mechanically coupled to the impact mechanism.

4. The robotic gripper of claim 1, wherein the driving device is an electric motor.

5. The robotic gripper of claim 1, wherein the hammer is axially biased towards the anvil.

6. A method for driving a finger of a grasping device in a robotic system, comprising:
   using a driving device to rotate an input drive shaft;
   rotating with said input drive shaft a hammer having at least a first contact face which is sloped at an angle that is less than 90° with respect to a plane of rotation of the hammer;
   engaging with said first contact face at least a second contact face formed on an anvil and sloped at an angle that is less than 90° with respect to a plane of rotation of the anvil for rotation of said anvil and an output shaft coupled thereto;
   when said output shaft is loaded beyond a threshold torque, guiding at least one of said hammer and said anvil in a first axial direction aligned with at least one of said input shaft and said output shaft to facilitate disengagement of said first contact face from said second contact face; and
   following said disengagement, accelerating a rotation of said hammer and then impacting said anvil to exert an impact torque upon said output shaft to exert a grasping force with said finger.

7. The method according to claim 6, further comprising urging at least one of said hammer and said anvil in a second axial direction opposed to the first axial direction to facilitate exerting said impact torque upon said output shaft.

8. The method according to claim 6, further comprising using said impact torque applied to said output shaft to concurrently exert said grasping force with a second finger.

9. The method according to claim 6, further comprising inhibiting a back-drive of at least said output shaft.

10. The method according to claim 9, further comprising inhibiting said back-drive of said output shaft by communicating said impact torque to said finger through a worm gear.

11. The method of claim 6, further comprising transferring a continuous torque to the output shaft when said driving device is activated and said output shaft is loaded to a level that is less than said threshold torque.

12. A robotic gripper, comprising:
   a plurality of fingers configured for grasping an object; and
   an actuator for driving at least one of the fingers, the actuator comprising:

a drive train mechanically coupled to the at least one finger for driving the at least one finger;

an impact mechanism mechanically coupled to the drive train for driving the drive train, and configured to generate a series of impacts that are delivered to the drive train when a torque loading value of said drive train exceeds a threshold torque;

the impact mechanism comprising an input shaft having a spring disposed thereon, a hammer coupled to an end of the input shaft and comprising first contact surfaces, and an anvil comprising second contact surfaces respectfully configured to be struck by the first contact surfaces; and a driving device mechanically coupled to the impact mechanism for driving the impact mechanism; and wherein the impact mechanism is further configured to generate a continuous torque that drives the drive train when said torque loading value is less than the threshold torque loading value; and wherein the threshold torque loading value is defined by a spring constant of the spring and angles of the first and second contact surfaces with respect to a rotational plane of the hammer or the anvil.

13. The robotic gripper of claim 12, wherein each of the first and second contact surfaces is set at an angle less than 90° degrees with respect to a rotational plane of the hammer or the anvil.

* * * * *